United States Patent
Wang

(10) Patent No.: US 11,895,678 B2
(45) Date of Patent: Feb. 6, 2024

(54) SELECTING A BANDWIDTH PART (BWP)

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 379 days.

(21) Appl. No.: 17/279,011

(22) PCT Filed: Sep. 11, 2019

(86) PCT No.: PCT/EP2019/074279
§ 371 (c)(1),
(2) Date: Mar. 23, 2021

(87) PCT Pub. No.: WO2020/064333
PCT Pub. Date: Apr. 2, 2020

(65) Prior Publication Data
US 2022/0039096 A1 Feb. 3, 2022

Related U.S. Application Data

(60) Provisional application No. 62/736,018, filed on Sep. 25, 2018.

(51) Int. Cl.
*H04W 72/52* (2023.01)
*H04B 17/318* (2015.01)
(Continued)

(52) U.S. Cl.
CPC .......... *H04W 72/52* (2023.01); *H04B 17/318* (2015.01); *H04W 72/02* (2013.01);
(Continued)

(58) Field of Classification Search
CPC ... H04W 72/02; H04W 72/044; H04W 72/52; H04B 17/318
See application file for complete search history.

(56) References Cited

U.S. PATENT DOCUMENTS

| | | | |
|---|---|---|---|
| 2018/0279289 A1* | 9/2018 | Islam | H04W 72/0446 |
| 2019/0141695 A1* | 5/2019 | Babaei | H04W 56/0045 |
| 2021/0274550 A1* | 9/2021 | Zhang | H04W 80/02 |

FOREIGN PATENT DOCUMENTS

| | | | | |
|---|---|---|---|---|
| CN | 110636613 A | * | 6/2018 | ............ H04W 72/04 |
| EP | 3 442 148 A1 | | 2/2019 | |
| WO | 2018/031799 A1 | | 2/2018 | |

OTHER PUBLICATIONS

International Search Report and Written Opinion dated Dec. 12, 2019 in International Application No. PCT/EP2019/074279 (16 pages total).

(Continued)

*Primary Examiner* — Jamal Javaid
*Assistant Examiner* — Ryan C Kavleski
(74) *Attorney, Agent, or Firm* — Christopher & Weisberg, P.A.

(57) ABSTRACT

The random access (RA) procedure in NR-U can be improved by enable the NR-U capable UE to choose a suitable BWP and uses this chosen BWP to perform the RA procedure. A suitable BWP is a BWP with a low probability for LBT failure, such as a BWP having a load that is less than a threshold load. For example, whenever the UE has a RA procedure triggered, the UE selects the most suitable BWP based on load information, such as load measurements made by the UE for one or more available BWPs or load information communicated to the UE. The selected BWP for the RA procedure may be different from the UE's currently active BWP, and, in this case, the UE may do a BWP switch before the RA procedure.

22 Claims, 14 Drawing Sheets

(51) Int. Cl.
   *H04W 72/02* (2009.01)
   *H04W 72/044* (2023.01)
   *H04W 74/08* (2009.01)
   *H04W 72/23* (2023.01)

(52) U.S. Cl.
   CPC ........ *H04W 72/044* (2013.01); *H04W 72/23* (2023.01); *H04W 74/0841* (2013.01)

(56) References Cited

OTHER PUBLICATIONS

MediaTek Inc., "Enhancements to the RACH procedure for NR-U", 3GPP TSG-RAN WG2 Meeting #103, R2-1812343, Gothenburg, Sweden, Aug. 20-24, 2018 (4 pages total).

Intel Corporation, "Random access procedure for NR-u", 3GPP TSG-RAN WG2 meeting #103, R2-1811663 (Revision of R2-1809788), Gothenburg, Sweden, Aug. 20-24, 2018 (3 pages total).

ZTE, "Considerations on channel access procedure for NR-U", 3GPP TSG RAN WG2 NR #103 Meeting, R2-1811281, Gothenburg, Sweden, Aug. 20-24, 2018 (4 pages total).

Qualcomm Incorporated, "DL signals and channels for NR-U", 3GPP TSG RAN WG1 Meeting #94, R1-1809477, Gothenburg, Sweden, Aug. 20-24, 2018 (9 pages total).

ZTE, "Considerations on UL reference signals and channels design for NR-U," 3GPP Draft R1-1808320, Considerations on UL Reference Signals and Channels Design for NR-U Final, 3GPP, Mobile Competence Centre; Aug. 11, 2018 (Aug. 11, 2018) (6 pages total).

Oppo, "UL BWP switching upon RACH for NR-U", 3GPP TSG-RAN WG2 Meeting #103, R2-1811066, Gothenburg, Sweden, Aug. 20-24, 2018 (2 pages total).

* cited by examiner

SELECTING A BANDWIDTH PART (BWP)

CROSS REFERENCE TO RELATED APPLICATION(S)

This application is a 35 U.S.C. § 371 National Stage of International Patent Application No. PCT/EP2019/074279, filed Sep. 11, 2019, which claims priority to U.S. provisional patent application no. 62/736,018, filed Sep. 25, 2018. The above identified applications are incorporated by this reference.

TECHNICAL FIELD

Disclosed are embodiments related to selecting a bandwidth part (BWP).

BACKGROUND

The 3rd Generation Partnership Project (3GPP) is in the process of developing the next generation radio access technology, named "5G New Radio" (5G NR) or just "NR" or "5G", for short. NR is expected to support a wide range of use cases with varying requirements ranging from fully mobile devices to stationary IoT or fixed wireless broadband devices. The traffic pattern associated with many use cases is expected to consist of bursts of data traffic with varying length of waiting period in between (here called inactive state).

Bandwidth Parts (BWPs)

NR provides a mechanism to adaptively adjust a user equipment's (UE's) operating bandwidth (BW) via the introduction of the bandwidth parts (BWPs), where generally a UE is not required to transmit or receive outside of the configured frequency range of the UE's currently active BWP. A BWP is subset of contiguous common resource blocks. That is, a BWP has a smaller bandwidth than the total available carrier bandwidth (CBW). FIG. 1 illustrates a carrier being divided into for BWPs for a particular UE. FIG. 1 also illustrates that, over time, a different one of the four BWPs is active, while the others are not active.

The BWP concept improves, among other things, energy efficiency. Wide BW has direct impact on the peak and user experienced data rates. However, because UEs are not always demanding high data rates, the use of wide BW may imply higher idling power consumption both from RF and baseband signal processing perspectives. In this regard, the newly developed concept of BWP for NR provides a means of operating UEs with smaller BW than the configured BW (CBW), which makes NR an energy efficient solution despite the support of wideband operation. Also, some UEs might not be able to use the entire available CBW, in which case these UE are assigned a BWP that they are capable of handling. Yet another advantage of BWPs is load balancing when the UEs do not need the entire CBW to meet the bit rate requirements.

So far, it has been agreed that each UE is assigned with at least an initial BWP (same for all UEs, narrow enough for all UEs to handle) and a default BWP. The default BWP may be the same as the initial BWP but may also be different (i.e. different UEs will typically have different default BWPs). In addition to initial and default BWP, the UE can be configured with additional BWPs. It has been agreed that a UE can have up to four downlink (DL) and four uplink (UL) BWPs. Generally, at any point in time, only one BWP is active for a specific UE. A UE may be configured with BWPs using Radio Resource Control (RRC) signaling.

Radio Resource Management (RRM) Measurements in NR Unlicensed Spectrum

In order to tackle the ever increasing data demands, both licensed and unlicensed spectrum are utilized to carry traffic. The standardization work for licensed spectrum in Rel-15 is still on-going and will be finished in 2018. Therefore, 3GPP has defined a study item on NR-based Access to Unlicensed Spectrum. At this study item, compared to the Long Term Evolution (LTE) License Assisted Access (LAA), NR unlicensed (NR-U) also need to support DC and standalone scenarios, where the MAC procedures including random access channel (RACH) and scheduling procedure on unlicensed spectrum are subject to the listen-before-talk (LBT) failures, while there was no such restriction in LTE LAA, since there was licensed spectrum in LAA scenario so the RACH and scheduling related signaling can be transmitted on the licensed spectrum instead of unlicensed spectrum.

The Radio Resource Management (RRM) procedures in NR-U is generally similar to the RRM procedures in LAA, since NR-U is aiming to reuse LAA and related technologies as much as possible to handle the coexistence between NR-U and other legacy radio access technologies (RATs). Channel access/selection for LAA was one of important aspects for co-existence with other RATs such as Wi-Fi. For instance, LAA has aimed to use carriers that are congested with Wi-Fi. Therefore, RRM measurements are useful for the congestion avoidance purpose.

In licensed spectrum, a UE measures Reference Signal Received Power (RSRP), and Reference Signal Received Quality (RSRQ) of the downlink radio channel, and provides the measurement reports to its serving network node (e.g., eNB or gNB). However, these measurements don't reflect the interference strength on the carrier. Another metric, Received Signal Strength Indicator (RSSI), can serve such purpose. At the network node it is possible to derive RSSI based on the received RSRP and RSRQ reports (assuming they are available). Due to the LBT failure, some reports in terms of RSRP or RSRP may be blocked (can be either due to that the reference signal transmission (DRS) is blocked in the downlink or the measurement report is blocked in the uplink). Hence, the measurements in terms of RSSI are very useful. The RSSI measurements together with the time information concerning when and how long the UEs have made the measurements can assist the network node to detect a hidden node. Additionally, the network node can measure the load situation of the carrier (e.g., channel occupancy) which is useful for the network to prioritize some channels for load balance and channel access failure avoidance purposes.

LTE LAA has defined to support measurements of averaged RSSI and channel occupancy for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

Random Access (RA) Procedures in NR Unlicensed (NR-U) Spectrum

The four-step random access (RA) procedure has been the current standard for legacy systems such as LTE and NR Rel-15. A two-step RA procedure has also been proposed. The RA procedure is also referred to as the "RACH procedure."

In the two-step procedure the UL messages are sent simultaneously and similarly the two DL messages are sent as a simultaneous response in the DL. In the legacy four-step procedure, one of the main usages of the first two messages is to obtain UL time alignment (TA) for the UE. In many situations, e.g. in small cells or for stationary UEs, this may not be needed since either a TA=0 will be sufficient (small cells) or a stored TA value from the last RA could serve also for the current RA (stationary UE). In future radio networks it can be expected that these situations are common, both due to dense deployments of small cells and a great number of, for example, stationary Internet-of-Things (IoT) devices. A possibility to skip the message exchange to obtain the TA value would lead to reduced RA latency and would be beneficial in several use cases, for example when transmitting infrequent small data packets. On the other hand, the two step RA procedure will consume more resources since it uses contention based transmission of the data. This means that the resources that are configured for the data may often be unused.

If both the four-step and two-step RA procedure are configured in a cell (and for the UE), the UE will chose a preamble from one specific set if it wants to do a four-step RA, and will choose a preamble from a different specific set if the UE wants to do a two-step RA. Hence a preamble partition distinguishes between four-step and two-step RA.

Legacy Four-Step Random Access (RA) Procedure

The legacy four-step RA procedure has been used in LTE and is also proposed as baseline for NR. The principle of this procedure is shown in FIG. 2. As shown, first the UE randomly selects a preamble and transmits the selected preamble (message-1). When the network node (e.g., eNB) detects the preamble, it estimates the timing alignment (TA) the UE should use in order to obtain UL synchronization at the network node. The network node responds by transmitting a message (message-2a) with the TA and a grant for the UE to transmit another message (message-3a). Message-3a includes a UE identifier for identifying the UE. The network node responds to message-3a by transmitting an acknowledgment (message-4). The message-4 gives contention resolution—i.e. only one UEs identifier will be included in message-4 even if several UEs have used the same preamble (and message-3a) simultaneously. In LTE, the 4 step RA procedure cannot be completed in less than 14 ms/TTI/SF.

Two-Step Random Access (RA) Procedure

The two-step RA procedure has much shorter latency than the ordinary four-step RA procedure. In the two-step RA procedure, the UE selects a preamble and transmits the selected preamble (message-1). The UE also transmits a message (message-2b) corresponding to message-3a from the four-step procedure. The message-2b is transmitted in the same subframe as message-1 or it is transmitted in the immediately following subframe. Message-2b is sent on a resource dedicated to the specific preamble. This means that both the preamble (message-1) and message-2b face contention, but contention resolution in this case means that either both preamble (message-1) and message-2b are sent without collision or both collide. The two-step procedure is depicted in FIG. 3. Upon successful reception of the preamble (message-1) and message-2b, the eNB will respond with a TA (message-3b), which by assumption should not be needed or just give very minor updates, and a message-4 for contention resolution.

An issue that may occur if the UE TA is bad (e.g. using TA=0 in a large cell or using an old TA even though the UE has moved) is that only the preamble can be detected by the network node because a transmission with an inaccurate TA value may interfere with transmissions from other UEs in the same cell and because the preamble signal has higher detection probability than the normal data due to its design pattern. In this case the network node may reply with an ordinary random access response (RAR) giving the UE an opportunity to transmit message-3a on a scheduled resource. This is a fallback to four-step RA.

SUMMARY

In NR Rel-15, an NR UE can be configured with up to 4 BWPs, but only at most one of these four BWPs is active at any given time. Accordingly, the NR UE monitors only one BWP for energy saving purposes. If the currently active BWP does not have sufficient bandwidth, the network node (e.g., gNB) can move the UE to another BWP. In NR unlicensed spectrum standalone scenario, 3GPP has decided to study enhancements for the RA procedure to avoid the negative impact due to the LBT failure.

One way to improve the RA procedure in NR-U is to enable the NR-U capable UE to choose a "suitable" BWP and uses this suitable BWP to perform the RA procedure. A suitable BWP is a BWP with a low probability for LBT failure, such as a BWP having a load that is less than a threshold load. For example, whenever the UE has a RA procedure triggered, the UE selects the most suitable BWP based on load measurements made by the UE for one or more available BWPs (e.g., RSSI and/or channel occupancy measurements) (e.g., the selection is based on the UE's load measurements alone and not based on any load indicator signaled by the network to the UE). The selected BWP for the RA procedure may be different from the UE's currently active BWP, and, in this case, the UE may do a "BWP switch" before the RA procedure (e.g., the UE sets the selected suitable BWP as the active BWP).

Another way to improve RA procedure is to have a network node (e.g., base station) provides to the UE BWP load information (referred to herein as a "load indicator") for at least one BWP that is different than the UE's active BWP so that the UE can decide whether or not to initiate a switch from its currently active BWP to a different BWP. A load indicator for a BWP may provide an indication as to the level of congestion experienced by the BWP. For example, the UE can be configured to select the BWP with lowest load and highest access successful possibility, which will result in a reduction in latency because there will be a lower probability of an LBT failure. In one embodiment, the UE selects a BWP different than its currently active BWP and then sends to the network node a BWP identifier identifying the selected BWP so that the network node can decide if a BWP switch is necessary or whether the UE should continue using its currently active BWP. In some embodiments, a new MAC CE type is defined (i.e., a new logical channel identifier (LCID) is defined), which new MAC CE type carries the load indicator(s) for one or more BWPs. This MAC CE can be applied for both UL and DL.

Accordingly, in one aspect there is provided a first method performed by a UE. The first method includes the UE receiving a message transmitted by a network node, characterized in that the message comprises bandwidth part (BWP) information comprising a first BWP load indicator for a first BWP, wherein the first BWP load indicator indicates a load status (e.g., a congestion or utilization level) of the first BWP, wherein the first BWP is a first subset of contiguous common resource blocks. The method also includes the UE obtaining the BWP information from the message.

In another aspect there is provided a second method performed by a UE. The second method includes the UE determining a set of two or more load indicators based on measurements performed by UE 102 (e.g., based solely on measurements performed by UE 102), wherein the set of load indicators includes i) a first load indicator indicating a load status of a first BWP and ii) a second load indicator indicating a load status of a second BWP. The method further includes the UE selecting a BWP based on the determined set of load indicators. In some embodiments, the selecting step is performed as a result of a triggering of an RA procedure (e.g., as a result of the UE determining to perform an RA procedure). In other embodiments, the selecting step is performed regardless of whether a RA procedure has been triggered (e.g., the selecting step is performed before a triggering of an RA procedure). In either of such embodiments, after selecting the BWP, the UE performs the RA procedure using the selected BWP.

In another aspect there is a method performed by a network node. The method includes the network node transmitting a message comprising bandwidth part (BWP) information comprising a first BWP load indicator for a first BWP, wherein the first BWP load indicator indicates a load status of the first BWP, wherein the first BWP is a first subset of contiguous common resource blocks.

Advantages

The embodiments disclosed herein improve performance of, for example, the RA procedure with respect to reduced latency and increased access success rate because the UE is provided with BWP load information, thereby enabling the UE to select a suitable BWP for use in performing the RA procedure or other transmission. That is, the negative impact due to LBT failure on UL data transfer and UL RACH performance is eliminated. Moreover, there will be no or minimal impact on the UE's battery life because the UE will not need to monitor multiple BWPs at the same time.

BRIEF DESCRIPTION OF THE DRAWINGS

The accompanying drawings, which are incorporated herein and form part of the specification, illustrate various embodiments.

DETAILED DESCRIPTION

While the below described embodiments may be described in the context of NR unlicensed spectrum (NR-U), the invention is not limited to NR-U scenarios because the invention is also applicable to, for example, non NR-U scenarios, for example, NR licensed scenarios or any scenario in which bandwidth is divided into BWPs.

Figure 1:
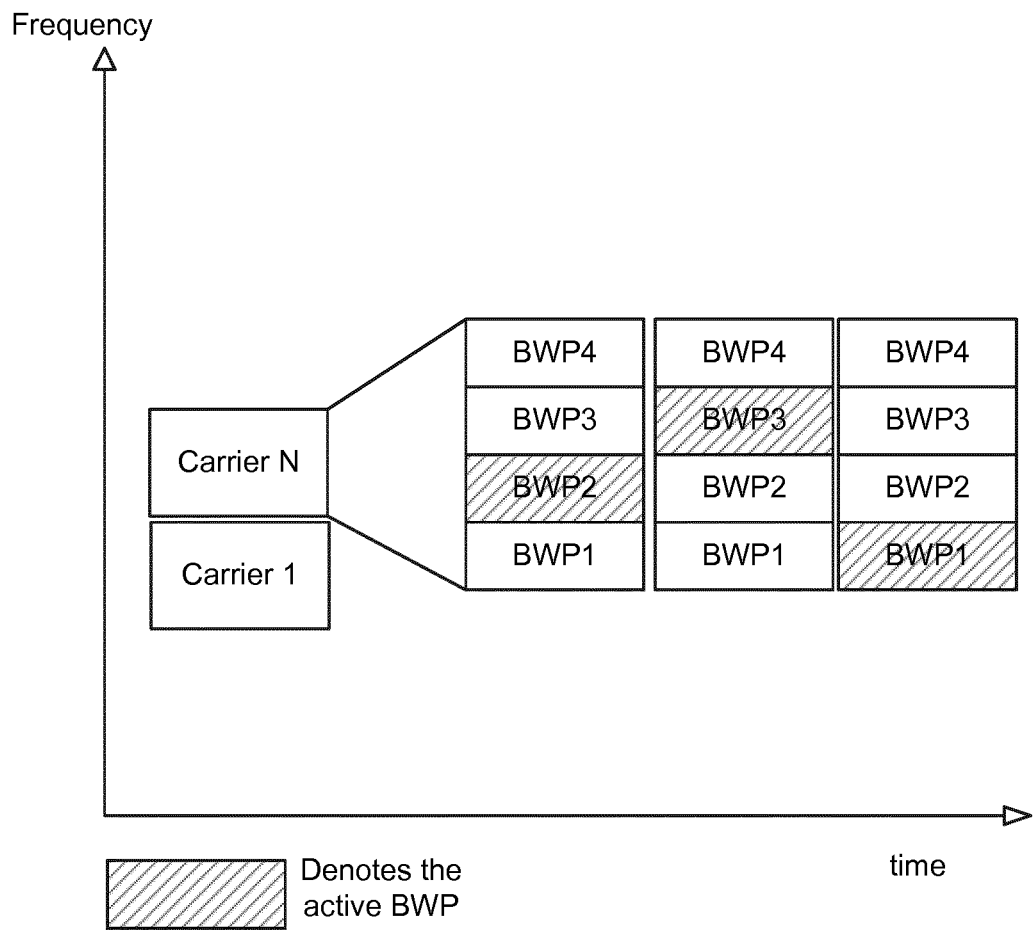
FIG. 1 illustrates a carrier being divided into four BWPs.
Figure 2:
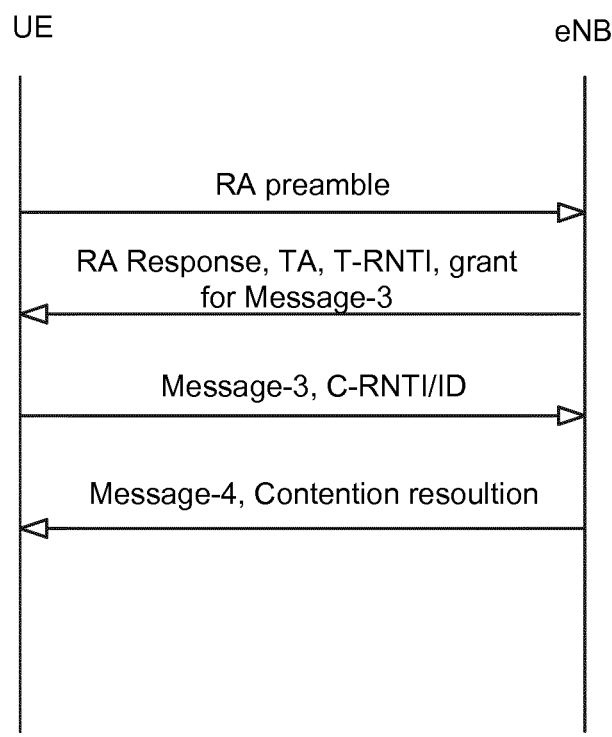
FIG. 2 illustrates a four-step RA procedure.
Figure 3:
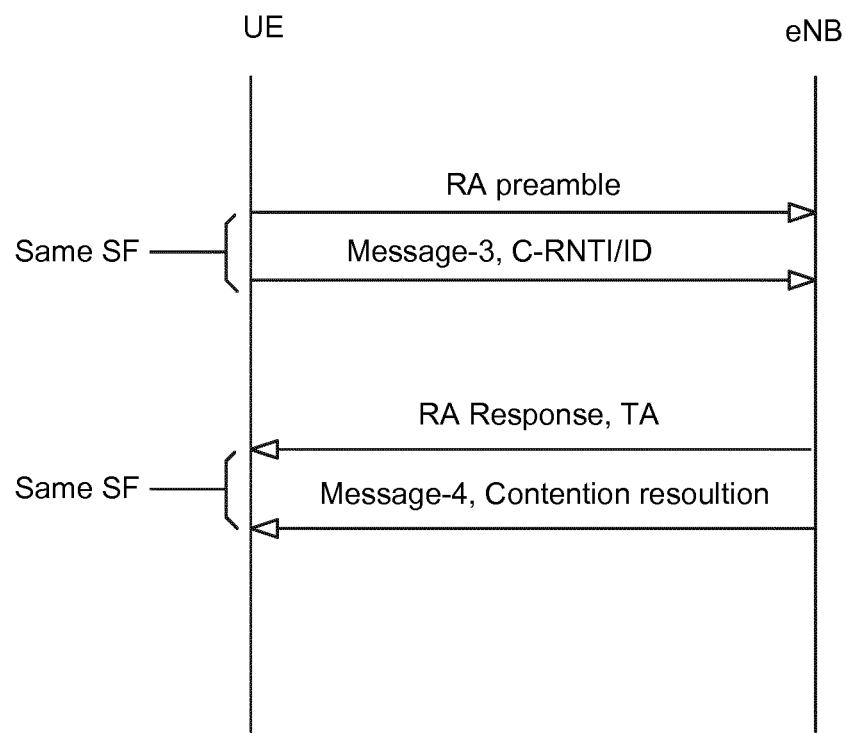
FIG. 3 illustrates a two-step RA procedure.
Figure 4:
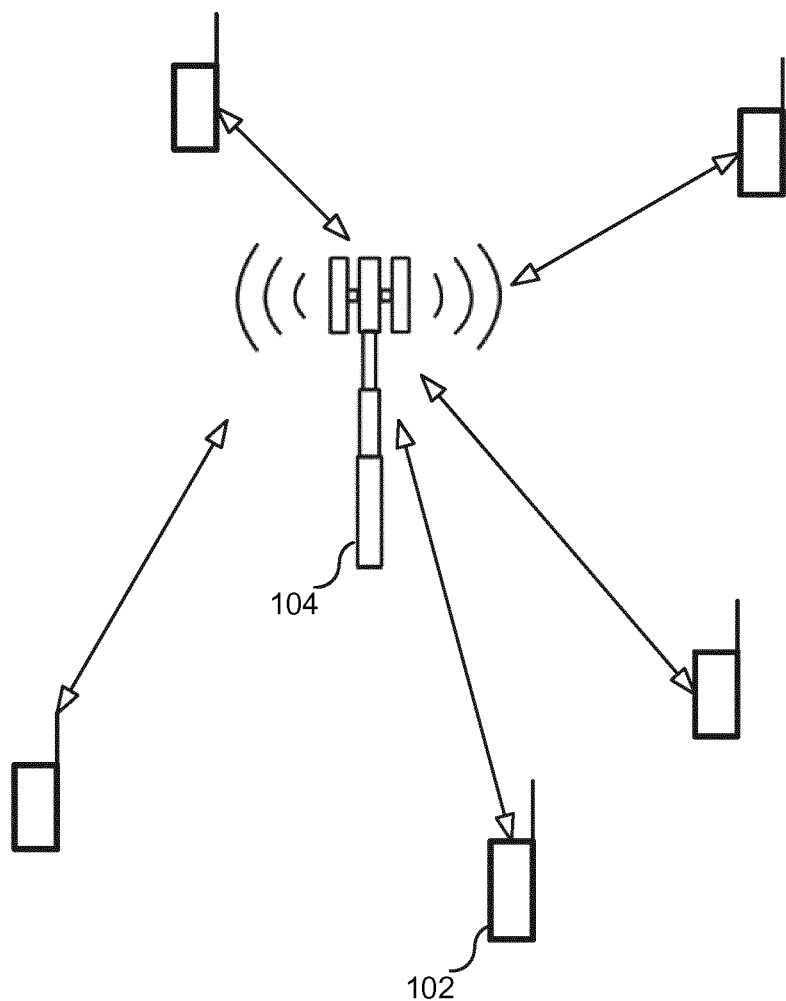
FIG. 4 illustrates a communication system according to an embodiment.

FIG. 4 illustrates a communication system (e.g., an NR communication system) in which a network node 104 (e.g., a base station such as, for example, an NR base station (gNB)) is in communication with multiple UEs, including a UE 102. Network node 104 is part of a radio access network 106, which enables the UEs to communicate with, among other things, communication devices connected to a network 110 (e.g., the Internet). As used herein a UE is any type of communication device that is operable to communicate wirelessly with network node 104. For example, a UE can be mobile (e.g., a smartphone, a tablet, a laptop computer) or generally fixed (e.g., a sensor, an appliance, or other IoT device).

In one embodiment, network node 104 collects, from each of the UEs, RRM measurements (e.g., RSSI and/or channel occupancy (CO) measurements). Based on this measurement data, network node 104 determines a load indicator (which may also be referred to as a congestion indicator) for one or more BWPs. Network node 104 then transmits to at least UE 102 a "BWP load indicator" (BWP-LI) message, which is a message comprising at least one load indicator for at least one BWP (such as, e.g., a BWP that is not UE 102's active BWP). This process may be repeated periodically. A load indicator for a BWP indicates a load status for the BWP (e.g., a congestion or occupancy level of the BWP).

There are many ways in which network node 104 can determine the value of the load indicator for a BWP based on RRM measurements. For example, the load indicator for a BWP may be one bit value that is set to a value 1 if a CO value for the BWP is above a CO threshold and/or an average RSSI value for the BWP is above an RSSI threshold, otherwise the bit is set to a value of 0. In another embodiment, the load indicator may be a vector that comprises a CO value for the BWP and/or an averaged RSSI value for the BWP. In other embodiments, the load indicator may be a whole number in the range of 0 to N, where N>1 (e.g., N=10) and the value of the load indicator is a function of a CO value for the BWP and/or an averaged RSSI value for the BWP.

In one embodiment, the BWP-LI message transmitted by network node 104 is a MAC CE. A MAC CE is a message that may comprise a MAC header (a.k.a., "subheader") and a payload (e.g., control information such as a BWP load indicator). The MAC subheader includes a logical channel identifier (LCID) field that contains an LCID that identifies a MAC CE type and at length information for identifying the length of the payload. In one embodiment, network node 104 transmits to UE 102 a MAC CE having a payload that contains the load indicator(s).

In some embodiments, the MAC CE payload may comprises a BWP index field containing a BWP index identifying a particular BWP and an associated load indicator field containing a load indicator for the particular BWP. It may be sufficient to use 1 byte to carry both the BWP index and the associated load indicator for one BWP. The network node 104 may determine the number of BWP load indicators to signal to UE 102. In case all four BWP load indicator are signaled to a UE, the MAC CE, in one embodiment, would require 4 bytes not including the MAC subheader.

In another embodiment, the BWP-LI message is included in a Radio Resource Control message. In yet another embodiment, the BWP-LI message is (or is included in) a Downlink Control Information (DCI) message, which is a message transmitted on a physical downlink control channel. In yet another embodiment, the BWP-LI message is (or is included in) a System Information Block (SIB), which is a message broadcast by network node 104.

In one embodiment, network node 104 may include in the BWP-LI message (e.g., MAC CE or other message) BWP load indicators for only the UE's "non-serving" BWPs (i.e., the BWPs assigned to the UE that are not the UE's currently active BWP) because the UE may be able to measure its active BWP by itself to determine a load indicator for its currently active BWP.

In some embodiments a cell index is included in the BWP-LI message and associated with one or more load indicators. For example, in the situations where network node 104 can signal load indicators for BWPs belonging to another serving cell, the network node 104 can include in the BWP-LI message a cell index identifying this other serving cell so that the load indicators are for BWPs belonging to the identified cell.

In some embodiments, a new MAC CE logical channel identifier (LCID) is defined such that when network node 104 sends a BWP load indicator to UE 102 using a MAC CE, the LCID carried in the MAC CE is the new LCID that identifies the MAC CE as a type of MAC CE that contains BWP load information. But if there is no free LCID available, then one can reuse the LCID of any existing MAC CE type, in case this existing MAC CE type is not applicable to the UE. Network node 104 can send dedicated signaling to the UE on the reused LCID. For example, the recommended bit rate MAC CE is defined for communication between network node 104 and a UE in order to change the bit rate for services such as VoIP or conversation video. If a UE doesn't transmit those services and would suffer from the LBT failures, then, in this case, the UE can use the LCID of recommended bit rate MAC CE to represent this new MAC CE.

In some embodiments, for efficiency purposes, the BWP-LI message may contain a set of bits (e.g., a bitmap), where each bit in the set corresponds to a different particular BWP and the value of the bit indicates whether or not the BWP-LI message contains a load indicator for the particular BWP. For example, the set of bits may consist of eight bits (b1, b2, . . . , b8), where each bit corresponds to a different BWP (e.g., bit bi corresponds to BWPi for i=1 to 8). In such an example, if only bits b2 and b4 are set to a value of 1, then the BWP-LI includes only a load indicator for BWP2 and a load indicator BWP4.

The BWP-LI (e.g., new MAC CE) can be transmitted by network node 104 to a UE together with other data intended for the UE.

In some embodiments, one or more events may trigger network node 104 to transmit a BWP-LI message. As one example, network node 104 may transmit a BWP-LI message as a result of network node 104 determining that the load of a BWP has changed such that the load is now above a predefined threshold. As another example, network node 104 may transmit a BWP-LI message to UE 102 as a result of network node 104 determining that UE 102 has changed its active BWP. As yet another example, network node 104 may transmit a BWP-LI message as a result of network node 104 determining that a timer has expired. The timer interval may be defined based on the data activity of the BWP/UE.

Upon triggering of any above event, network node 104 can transmit the BWP-LI message to a UE when there is a DL assignment available to that UE. The priority of this BWP-LI message compared to other DL control messages can be determined/configured by network node 104. A fixed priority order may be hard coded in a specification.

Figure 5:
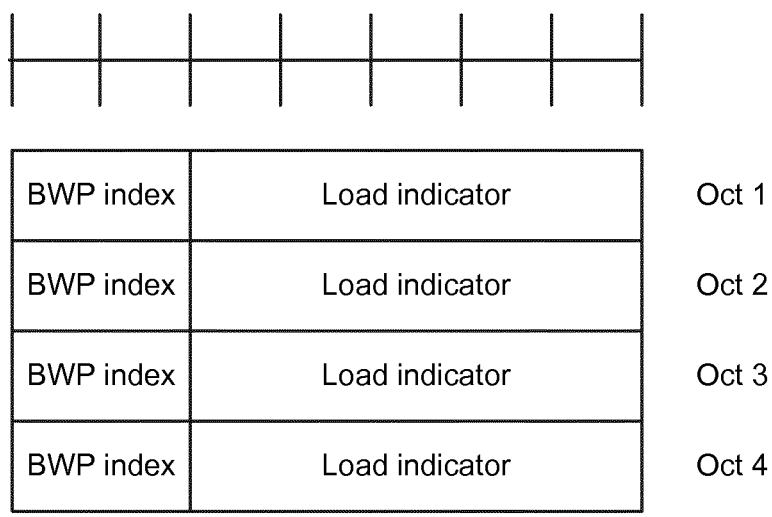
FIG. 5 illustrates an example of a first MAC CE format.

FIG. 5 illustrates an example of a MAC CE that may be transmitted by network node 104 to UE 102. The example MAC CE includes load indicators for each of four BWPs that are configured for UE 102. Other example may be possible with different sizes for BWP index or congestion indicator field.

Figure 6:
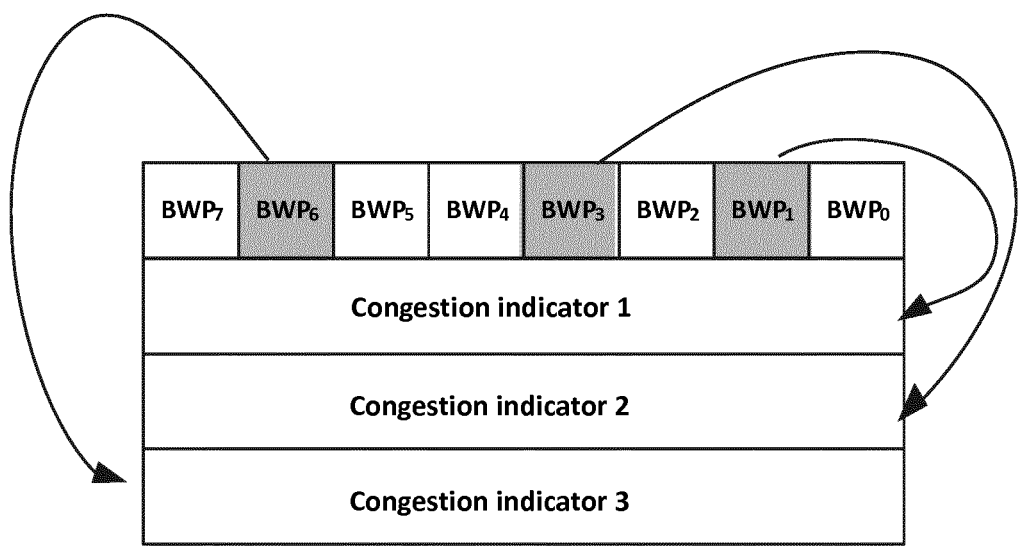
FIG. 6 illustrates an example of a second MAC CE format.

FIG. 6 illustrates another example of a MAC CE that may be transmitted by network node 104 to UE 102. In this example the MAC CE includes a bitmap where each bit indicates the presence or absence of a corresponding BWP load indicator. In this example, the bitmap comprises 8 bits to indicate 8 different BWPs. That is, as described above, each bit corresponds to a different BWP (e.g., bit bi corresponds to BWPi for i=1 to 8). Because some of these BWPs may belong to a first serving cell and some of these BWPs may belong to second serving cell, a rule mapping between BWP indices and the cell indices may be defined. The capability for a UE to report BWPs across different serving cells may be useful in a carrier aggregation scenario where the MAC CE is signaled on the other serving cells if the serving cell link is blocked by the LBT failures.

Figure 7:
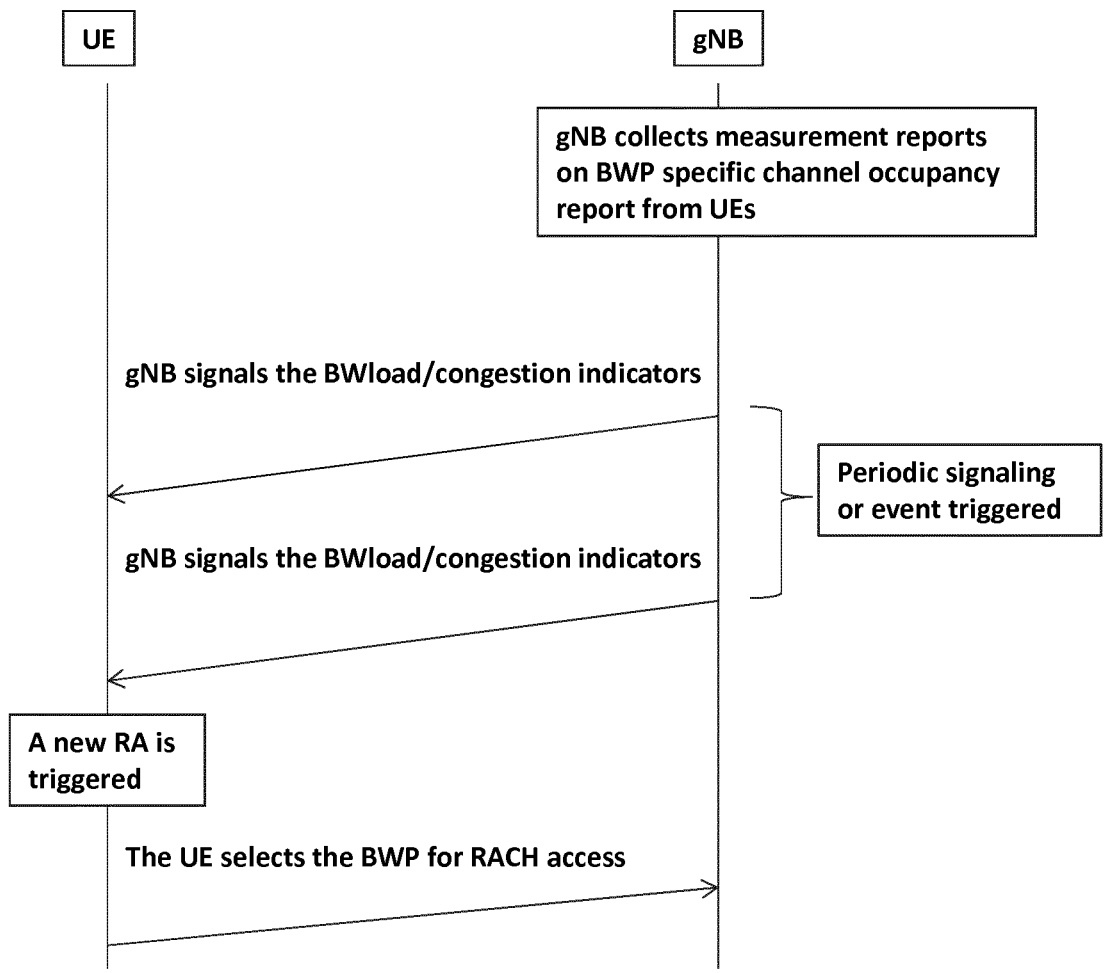
FIG. 7 is a message flow diagram illustrating a message flow according to one embodiment.

In some embodiments, as are result of a triggering of an RA procedure, UE 102 selects the most suitable BWP (e.g., the BWP with the lowest load indicator and also with PRACH resource available) based on a BWP-LI message received from a network node. If the selected BWP is not the currently active BWP, UE 102 performs the BWP switch to the selected one before initiating the RA procedure (e.g., before transmitting message-1). After performing the switch, UE 102 initiates the RA procedure on the selected BWP (i.e., UE 102 transmits, at the least, message-1 over the selected BWP), which is now the currently active BWP. An example of the message flow is illustrated in the message flow diagram illustrated in FIG. 7. As shown in FIG. 7, the network node 104 collects channel occupancy reports from UEs and signals the BWP specific load indicators to the relevant UEs. The UE can then select the BWP with lowest load for RA procedure (e.g., the BWP that has the lowest occupancy).

In other embodiments, UE 102 selects the BWP regardless of whether a RA procedure has been triggered (e.g., UE 102 selects the BWP prior to a triggering of an RA procedure), but when an RA procedure is triggered, UE 102 uses the selected BWP to perform the RA procedure.

In another embodiment, while an RA procedure is on-going and UE 102 receives from network node 104 a BWP-LI message indicating that the currently selected BWP for RA procedure no longer has the lowest load compared to other BWPs, UE 102 may decide to stop the current on-going RA procedure and switch to the other BWP with lowest load. The UE would then re-start the RA procedure on the new BWP instead. In another option, the UE may not stop the on-going RA procedure on the old BWP, and just continue/move the on-going RA procedure to another BWP which has lowest load after the BWP switch.

In some embodiments, UE 102 may choose to switch to another BWP as a result of UE 102 determining that the current active BWP may be congested even where the most recently received BWP-LI message may not reflect the current load status of the current active BWP. Additionally, the BWP switch may be also triggered by UE 102 when UE 102 has data to be transmitted to the network with critical QoS requirements and high priority, or the data volume of the newly arrived data is above a predefined threshold.

In some embodiments, UE 102 may indicate a new BWP via Physical Uplink Control Channel (PUCCH) signaling (such as a Scheduling Request (SR) with specified SR occasion/resource or other signaling means (such as MAC CE or RRC signaling)). The signaling on the new BWP may be also carried by an additional indicator in the Uplink Control Information (UCI) information carried on PUCCH or the Physical Uplink Shared Channel (PUSCH). UE 102 may also indicate its preferred new BWP via an RA procedure. Upon reception of the signaling on the new BWP, network node 104 can decide if UE 102 shall switch to this new BWP or stay on the current active BWP, or switch to another new BWP which is different from the one that is indicated by UE 102. An example of is shown in FIG. 8.

Figure 8:
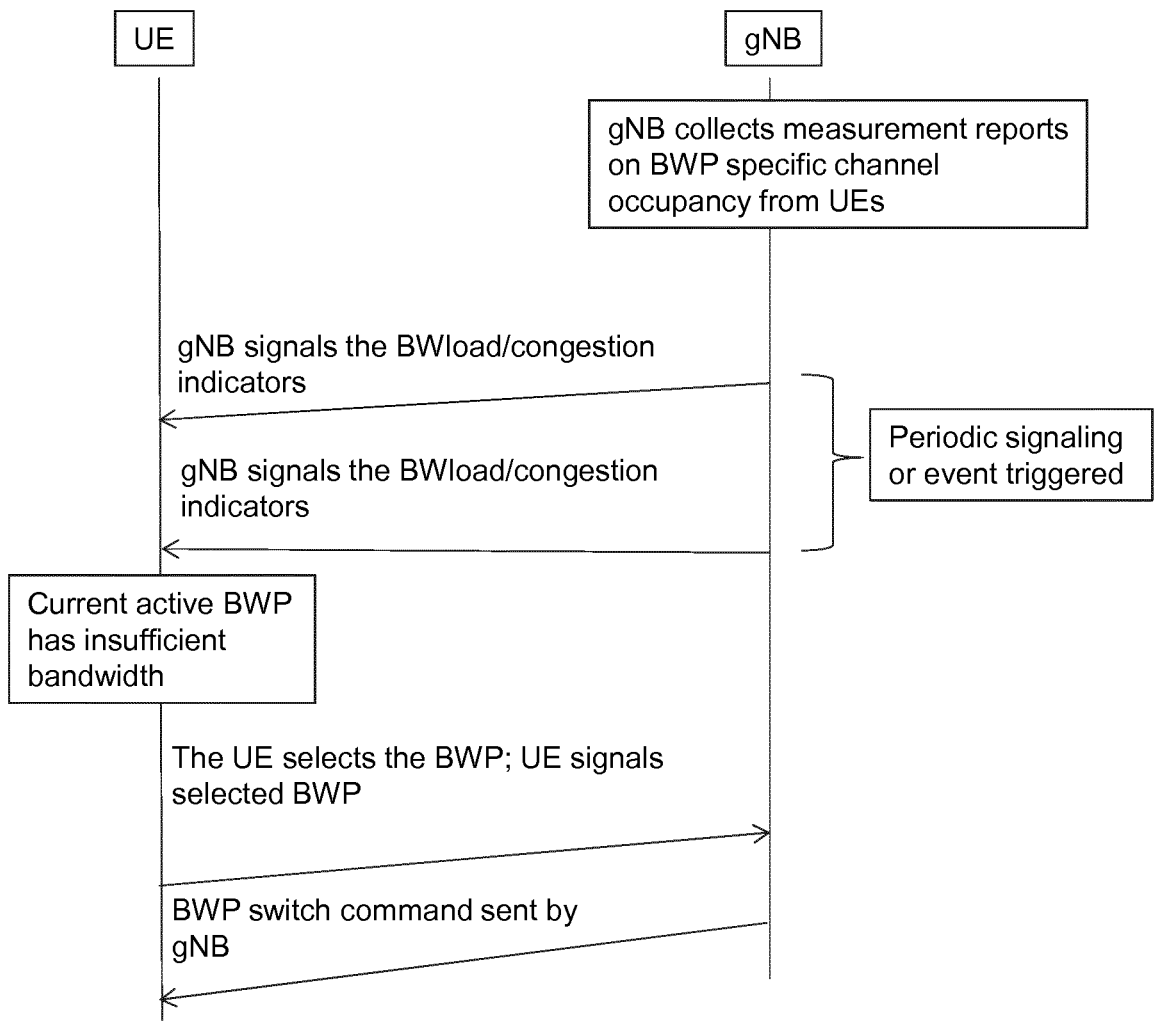
FIG. 8 is a message flow diagram illustrating a message flow according to one embodiment.

FIG. 8. shows an example message flow. As shown in FIG. 8, network node 104 obtains from various UEs RRM reports containing, for example, RSSI and/or channel occupancy (CO) measurements. Next, network node 104 transmits to UE 102 one or more BWP-LI message. For example, network node 104 may transmit periodically to UE 102 a BWP-LI message. UE 102, after receiving a BWP-LI message, can then select a BWP with lowest load and available resources (e.g., PRACH resources) for next data transfer. After selecting a BWP, UE 102 transmits to network node 104 a message (e.g., SR, MAC CE, RRC) comprising information indicating the selected BWP. Network node 104 can then make a decision as to whether to allow UE 102 to switch to the selected BWP, stay on the currently active BWP, or switch to a BWP selected by network node 104. After network node 104 makes this decision, network node 104 transmits to UE 102 a indicating the decision reached by network node 104 (i.e., the message indicates i) that UE 102 should switch to the UE 102 selected BWP, ii) that UE 102 should stay on the currently active BWP, or iii) that UE 102 should switch to a BWP selected by network node 104). If the message indicates that UE 102 should switch to a BWP selected by network node 104, then the message may include a BWP indicator that indicates the BWP selected by network node 104.

In some embodiments, UE 102's MAC entity reports to network node 104 the load of its current active BWP/serving cell/carrier. That is, for example, UE 102 may transmit to network node 104 a MAC CE that includes a load indicator for UE 102's currently active BWP, wherein UE 102 itself determined the value for the load indicator (e.g., UE 102 may determine the value for the load indicator based on RSSI and/or CO measurements). Thus, the MAC CE transmitted by UE 102 to network node 104 may have the same format as a MAC CE described above (see, e.g., FIG. 5 and FIG. 6). The MAC CE transmitted by UE 102 may also have a different format to include additional measurements on RSSI and/or channel occupancy (CO). In such a way, the UE has an additional means to report RSSI and CO to network node 104 in addition of the RRC signaling.

In some embodiments, the above described UE functionality can be enabled or disabled by network node 104 via signaling, such as SIB, dedicated RRC signaling, MAC CE or other L1/L2 signaling means such as DCI or PUCCH/RACH based signaling options.

Figure 9A:
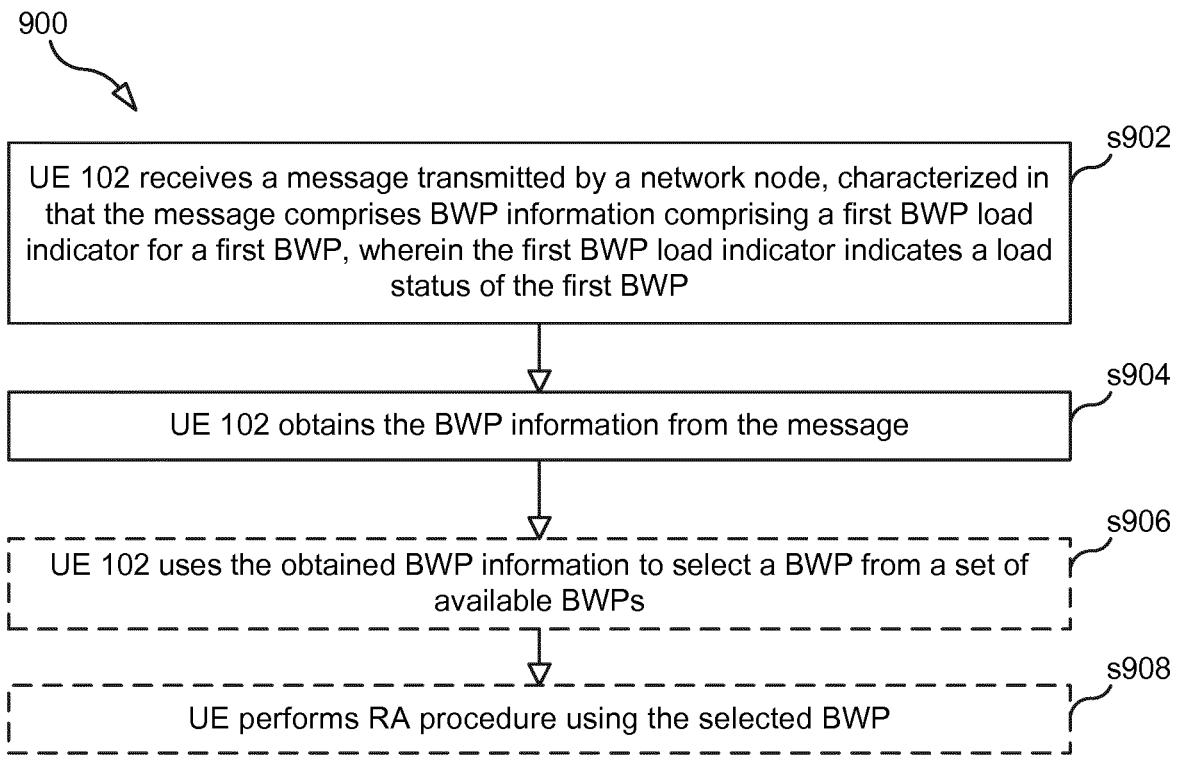
FIG. 9A is a flow chart illustrating a process according to one embodiment.

FIG. 9A is a flow chart illustrating a process 900 performed by UE 102, according to one embodiment. Process 900 may begin in step s902.

In step s902, UE 102 receives a message transmitted by a network node, characterized in that the message comprises bandwidth part (BWP) information comprising a first BWP load indicator for a first BWP, wherein the first BWP load indicator indicates a load status of the first BWP, wherein the first BWP is a first subset of contiguous common resource blocks (i.e., the message is a BWP-LI message).

In step s904, UE 102 obtains the BWP information from the message.

In step s906, UE 102 uses the obtained BWP information to select a BWP from a set of available BWPs. In some embodiments, UE 102 uses the obtained BWP information to select a BWP (i.e., performs step s906) as a result of a triggering of a random access (RA) procedure, but in other embodiments UE 102 performs step s906 regardless of whether a RA procedure has been triggered. In such an embodiment process 900 may further include: UE 102 determining whether the selected BWP has a resource available to allow UE 102 to perform the RA procedure; and, as a result of determining that the selected BWP has a resource available to allow UE 102 to perform the random access procedure, UE 102 switches from an active BWP to the selected BWP and uses the selected BWP to perform the random access procedure (step s908).

In some embodiments, UE 102 uses the obtained BWP information to select a BWP after UE 102 has initiated a random access procedure and before the random access procedure has completed. In such an embodiment process 900 may further include: UE 102 determining whether the selected BWP has a resource available to allow the random access procedure to be completed; and, as a result of determining that the selected BWP has a resource available to allow the random access procedure to be completed, UE 102 switches from an active BWP to the selected BWP and UE 102 uses the selected BWP to complete the random access procedure or restart the random access procedure.

In some embodiments, the method includes UE 102 transmitting to network node 104 information identifying the BWP selected by UE 102; and, after transmitting the information to network node 104, UE 102 receives a response message transmitted by network node 104, wherein the response message contains information indicating whether or not UE 102 should switch from a currently active BWP to the selected BWP such that the selected BWP becomes UE 102's new active BWP.

In some embodiments, process 900 further includes UE 102 determining a load status for UE 102's currently active BWP, wherein the currently active BWP is different than the first BWP; and further includes UE 102 using the obtained BWP information and the determined load status for the currently active BWP to select a BWP from a set of available BWPs. In such an embodiment, process 900 may further include UE 102 transmitting to the network node a message (e.g., a MAC CE) comprising information indicating the determined load status for the currently active BWP. In some embodiments, the message further includes a received signal strength indicator, RSSI, value and/or a channel occupancy, CO, value.

Figure 9B:
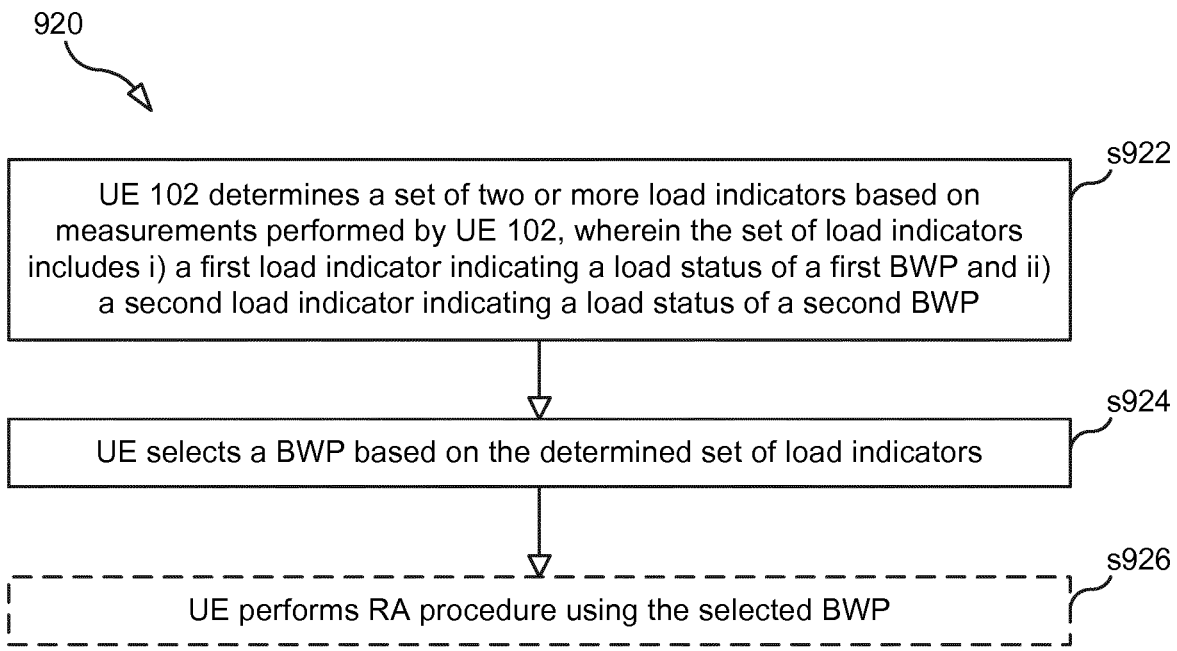
FIG. 9B is a flow chart illustrating a process according to one embodiment.

FIG. 9B is a flow chart illustrating a process 920 performed by UE 102, according to one embodiment. Process 920 may begin in step s922. In step s922, UE 102 determines a set of two or more load indicators based on measurements performed by UE 102 (e.g., based solely on measurements performed by UE 102). The set of load indicators includes i) a first load indicator indicating a load status of a first BWP and ii) a second load indicator indicating a load status of a second BWP. In step s924, UE 102 selects a BWP based on the determined set of load indicators. In some embodiments, the selecting step is performed before a triggering of an RA procedure. In other embodiments, the selecting step is performed as a result of a triggering of an RA procedure. In some embodiments, process 920 further includes the UE, after selecting the BWP, performing the RA procedure using the selected BWP (step s926). In some embodiments, process 920 further includes, prior to performing the RA procedure using the selected BWP, UE 102 determines whether the selected BWP has a resource available to allow the UE to perform the RA procedure, wherein UE 102 performs the RA procedure using the selected BWP as a result of determining that the selected BWP has the resources available to allow the UE to perform the RA procedure.

Figure 10:
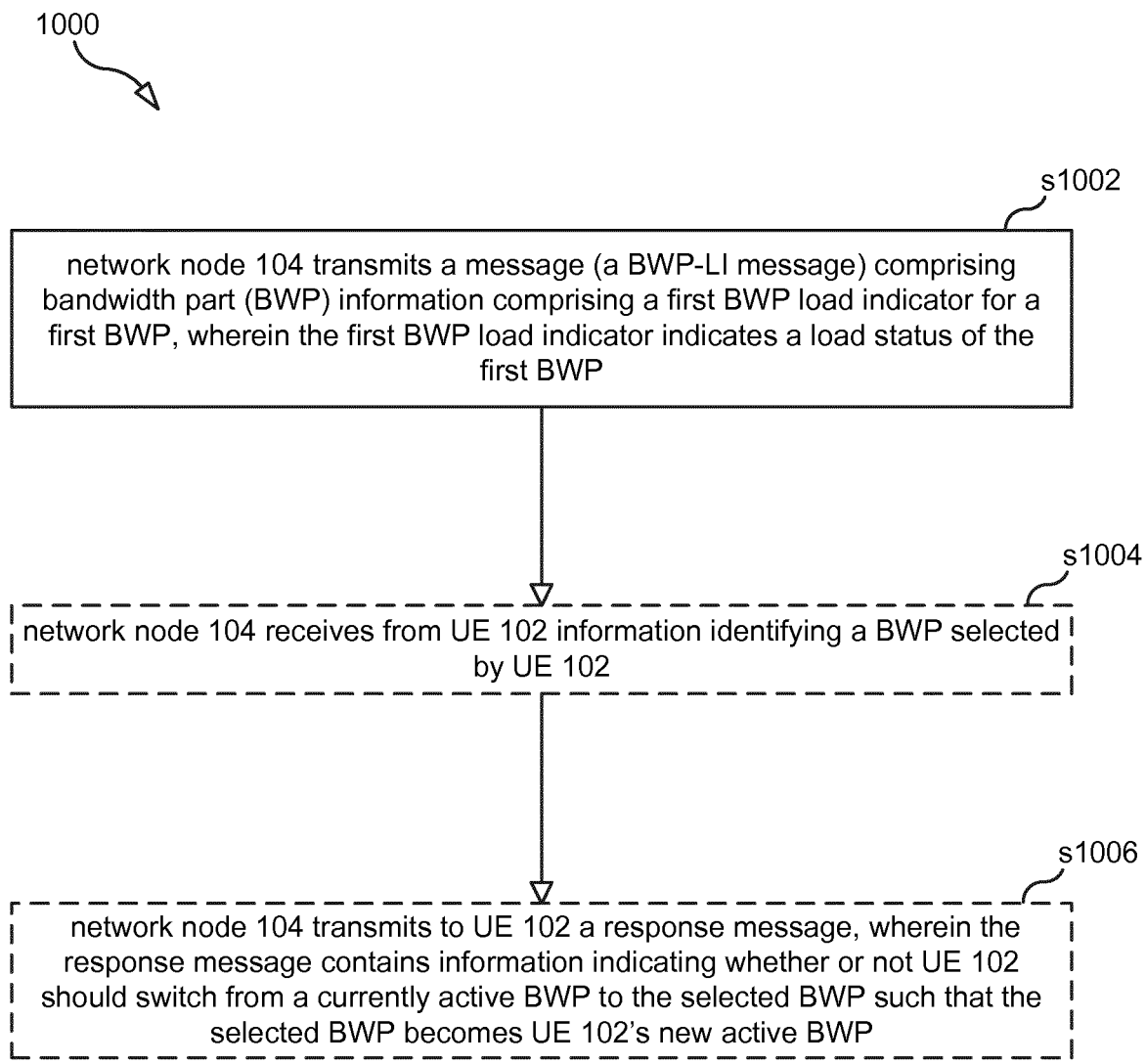
FIG. 10 is a flow chart illustrating a process according to one embodiment.

FIG. 10 is a flow chart illustrating a process 1000 performed by network node 104, according to one embodiment. Process 1000 may begin in step s1002.

In step s1002, network node 104 transmits a message (a BWP-LI message) comprising bandwidth part (BWP) information comprising a first BWP load indicator for a first BWP, wherein the first BWP load indicator indicates a load status of the first BWP, wherein the first BWP is a first subset of contiguous common resource blocks.

In step s1004 (optional), network node 104 receives from UE 102 information identifying a BWP selected by UE 102 based on the transmitted BWP information.

In step s1006 (optional), after receiving the information, network node 104 transmits to UE 102 a response message, wherein the response message contains information indicating whether or not UE 102 should switch from a currently active BWP to the selected BWP such that the selected BWP becomes UE 102's new active BWP.

In some embodiments, process 1000 further includes network node 104 receiving from UE 102 a message comprising information indicating a load status for UE 102's currently active BWP as determined by UE 102. In some embodiments, the message comprising the information indicating the determined load status for the currently active BWP further comprises a received signal strength indicator, RSSI, value and/or a CO value.

In some embodiments, network node 104 transmits the message comprising bandwidth part (BWP) information as a result of: a) determining that the load status of a BWP has changed and is above a predefined threshold; b) determining that a UE has changed its active BWP; or c) network node 104 detecting the expiration of a timer.

In some embodiments, process 1000 further includes network node 104 determining the load indicator based on an average RSSI value and/or a channel occupancy, CO, value.

Figure 11:
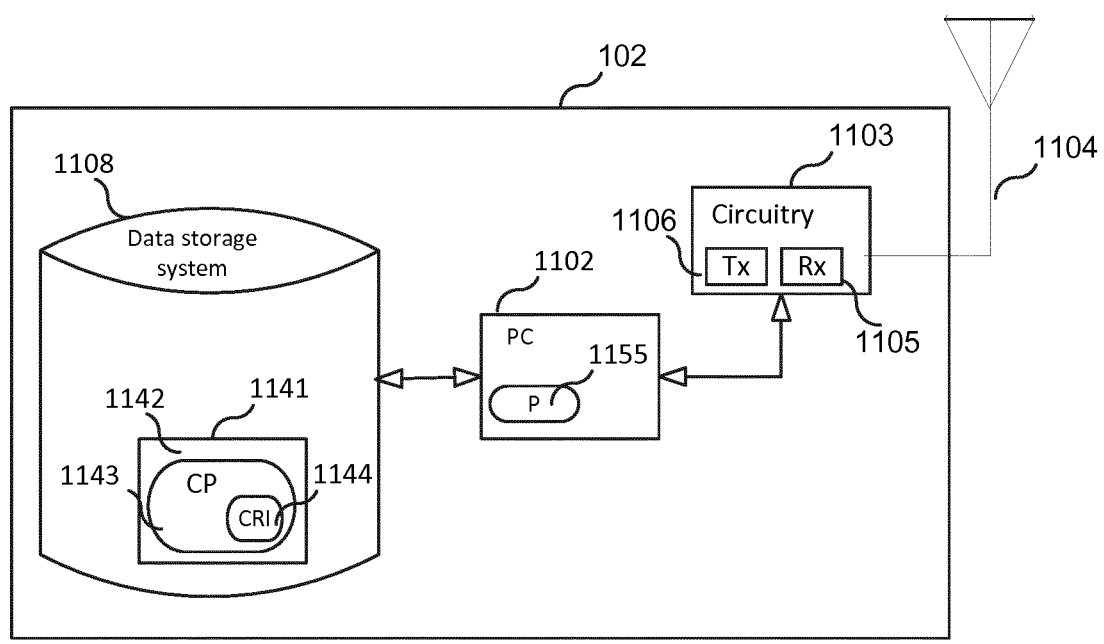
FIG. 11 is a block diagram of a UE according to one embodiment.

FIG. 11 is a block diagram of UE 102, according to some embodiments for performing methods disclosed herein. As shown in FIG. 11, UE 102 may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like), which processors may be co-located or distributed in different locations; circuitry 1103 (e.g., radio transceiver circuitry comprising an Rx 1105 and a Tx 1106) coupled to an antenna system 1104 for wireless communication); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes UE 102 to perform steps described herein (e.g., steps described herein with reference to the flow charts). In other embodiments, UE 102 may be configured to perform steps described herein without the need for code. That is, for example, PC 1102 may consist merely of one or more ASICs. Hence, the features of the embodiments described herein may be implemented in hardware and/or software.

Figure 12:
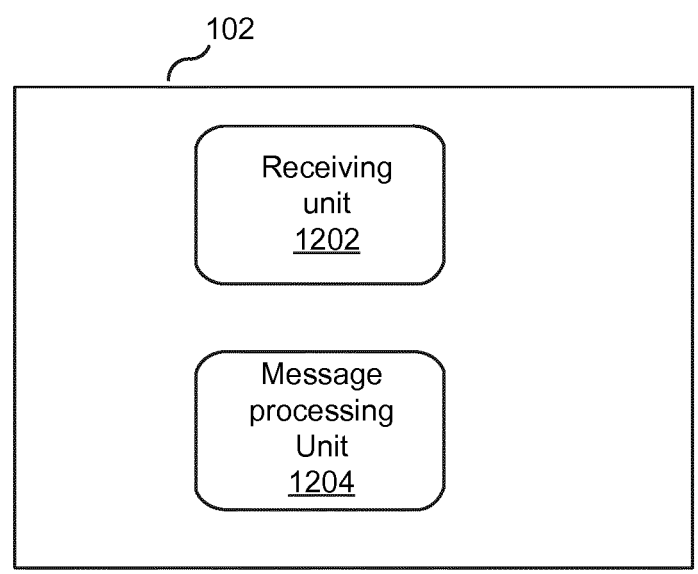
FIG. 12 is a diagram showing functional units of a UE according to one embodiment.

FIG. 12 is a diagram showing functional units of UE 102 according to an embodiment. As shown in FIG. 12, UE 102 includes a receiving unit 1202 operable to receive a message transmitted by a network node, characterized in that the message comprises bandwidth part (BWP) information comprising a first BWP load indicator for a first BWP, wherein the first BWP load indicator indicates a load status of the first BWP, wherein the first BWP is a first subset of contiguous common resource blocks; and a message processing unit 1204 configured to obtain the BWP information from the message.

Figure 13:
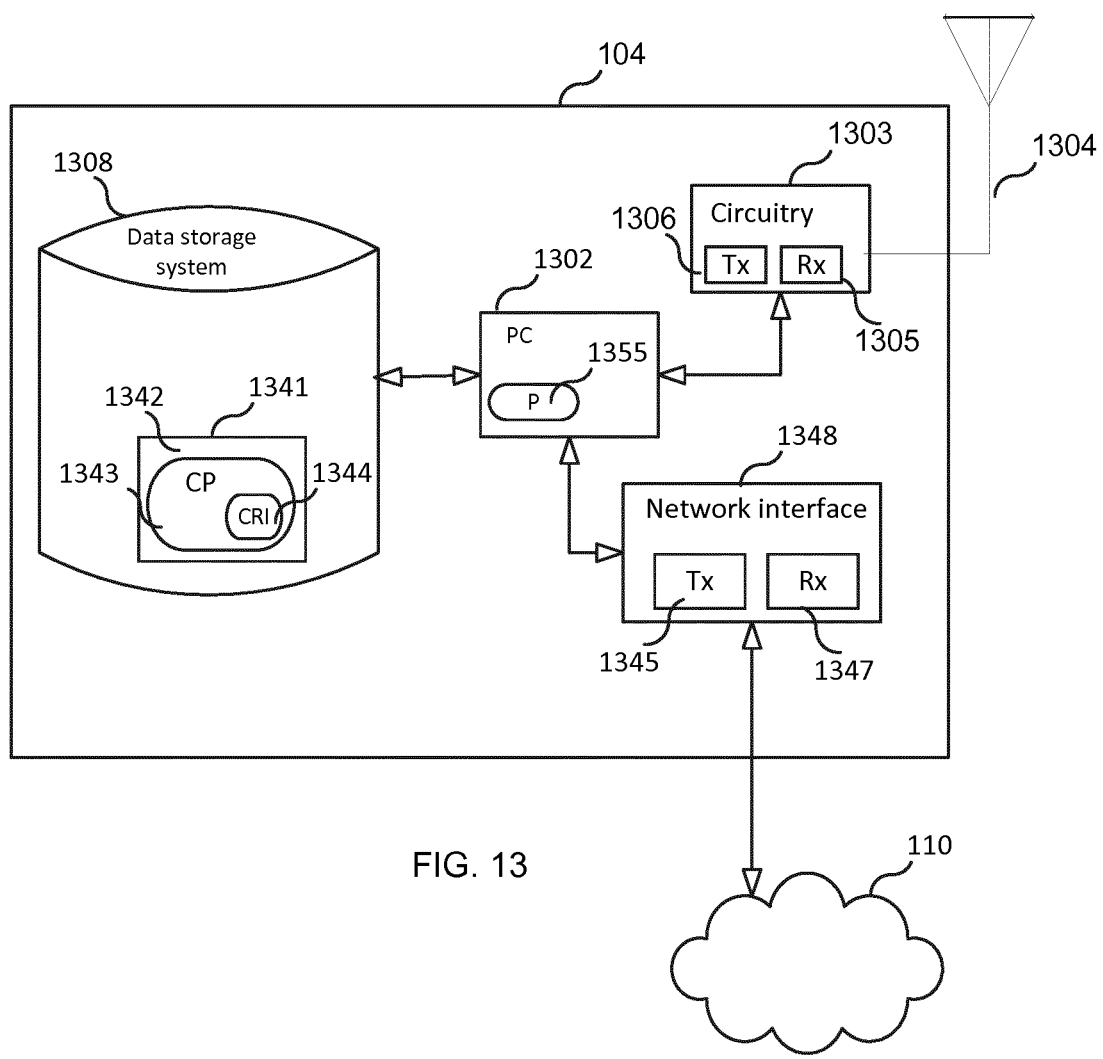
FIG. 13 is a block diagram of a network node according to one embodiment.

FIG. 13 is a block diagram of network node 104, according to some embodiments for performing methods disclosed herein. As shown in FIG. 13, network node 104 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like), which processors may be co-located or distributed in different locations; a network interface 1348 comprising a transmitter (Tx) 1345 and a receiver (Rx) 1347 for enabling network node 104 to transmit data to and receive data from other nodes connected to a network 110 (e.g., an Internet Protocol (IP) network) to which network interface 1048 is connected (directly or indirectly); circuitry 1303 (e.g., radio transceiver circuitry comprising an Rx 1305 and a Tx 1306) coupled to an antenna system 1304 for wireless communication); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes network node 104 to perform steps described herein (e.g., steps described herein with reference to the flow charts). In other embodiments, network node 104 may be configured to perform steps described herein without the need for code. That is, for example, PC 1302 may consist merely of one or more ASICs. Hence, the features of the embodiments described herein may be implemented in hardware and/or software.

Figure 14:
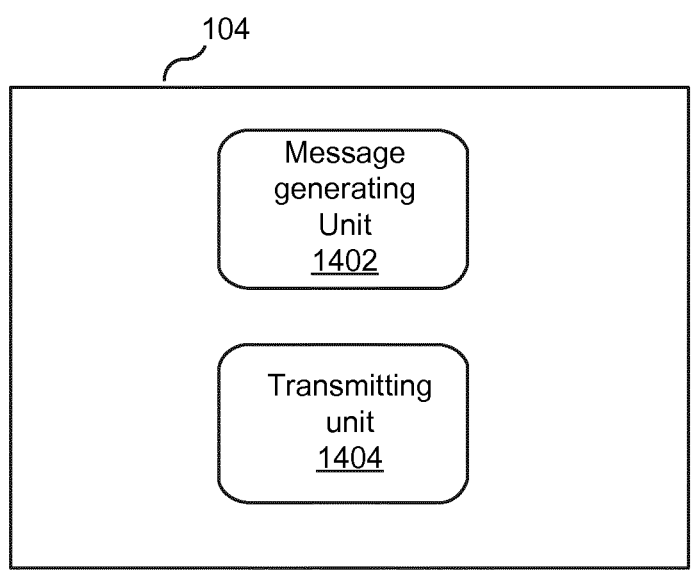
FIG. 14 is a diagram showing functional units of a network node according to one embodiment.

FIG. 14 is a diagram showing functional units of network node 104 according to an embodiment. As shown in FIG. 14, network node 104 includes a message generating unit 1402 for generating a message comprising bandwidth part (BWP)

information comprising a first BWP load indicator for a first BWP, wherein the first BWP load indicator indicates a load status of the first BWP, wherein the first BWP is a first subset of contiguous common resource blocks; and a transmitting unit 1404 for employing transmitter 1306 to transmit the message.

Concise Description of Some of the Embodiments

A1. A method performed by a user equipment, UE, the method comprising: the UE receiving a message transmitted by a network node, characterized in that the message comprises bandwidth part, BWP, information comprising a first BWP load indicator for a first BWP, wherein the first BWP load indicator indicates a load status of the first BWP, wherein the first BWP is a first subset of contiguous common resource blocks; the UE obtaining the BWP information from the message.

B1. A method performed by a network node, the method comprising: the network node transmitting a message comprising bandwidth part, BWP, information comprising a first BWP load indicator for a first BWP, wherein the first BWP load indicator indicates a load status of the first BWP, wherein the first BWP is a first subset of contiguous common resource blocks.

C1. The method of embodiment A1 or B1, wherein the message is: a media access control, MAC, control element, CE; a Radio Resource Control, RRC, message; Downlink Control Information, DCI, transmitted on a control channel; or a System information Block, SIB.

C2. The method of any one of the previous embodiments, wherein the BWP information further comprises a second BWP load indicator for a second BWP, wherein the second BWP load indicator indicates a load status of the second BWP, wherein the second BWP is a second subset of contiguous common resource blocks, wherein the second subset does not overlap with the first subset.

C3. The method of embodiment C2, wherein the BWP information further comprises a bit map comprising a set of N bits, wherein N is greater than 1; each of the N bits corresponds to a different BWP of the set of contiguous common resource blocks, and for each bit included in the set of N bits, the value of the bit indicates whether or not the message includes a BWP load indicator for the BWP to which the bit corresponds.

C4. The method of embodiment A1, B1, C1, or C2, wherein the BWP information further comprises a first BWP index, wherein the first BWP index identifies the first BWP.

C5. The method of any one of the embodiments A1 or C1-C4, further comprising the UE using the obtained BWP information to select a BWP from a set of available BWPs.

C6a. The method of embodiment C5, wherein the UE uses the obtained BWP information to select a BWP as a result of a triggering of a random access (RA) procedure.

C6b. The method of embodiment C5, wherein the UE uses the obtained BWP information to select a BWP regardless of whether a random access (RA) procedure has been triggered.

C6c. The method of embodiment C6a or C6b, further comprising: the UE determining whether the selected BWP has a resource available to allow the UE to perform the random access procedure; and as a result of determining that the selected BWP has a resource available to allow the UE to perform the random access procedure, the UE switching from an active BWP to the selected BWP and the UE using the selected BWP to perform the random access procedure.

C7. The method of embodiment C5, wherein the UE uses the obtained BWP information to select a BWP after the UE has initiated a random access procedure and before the random access procedure has completed, and the method further comprises: the UE determining whether the selected BWP has a resource available to allow the random access procedure to be completed; and as a result of determining that the selected BWP has a resource available to allow the random access procedure to be completed, the UE switching from an active BWP to the selected BWP and the UE using the selected BWP to: complete the random access procedure or restart the random access procedure.

C8. The method of embodiment C5, further comprising: the UE transmitting to the network node information identifying the BWP selected by the UE based on the received BWP information; and after transmitting the information to the network node, the UE receiving a response message transmitted by the network node, wherein the response message contains information indicating whether or not the UE should switch from a currently active BWP to the selected BWP such that the selected BWP becomes the UE's new active BWP.

C9. The method of any one of the embodiments A1 or C1-C8, further comprising: the UE determining a load status for a currently active BWP, wherein the currently active BWP is different than the first BWP; and the UE using the obtained BWP information and the determined load status for the currently active BWP to select a BWP from a set of available BWPs.

C10. The method of embodiment C9, further comprising the UE transmitting to the network node a message (e.g., a MAC CE) comprising information indicating the determined load status for the currently active BWP.

C11. The method of embodiment C10, wherein the information indicating the determined load status for the currently active BWP further comprises a received signal strength indicator, RSSI, value and/or a channel occupancy, CO, value.

C12. The method of any of the embodiment B1 or C1-C4, further comprising: the network node receiving from the UE information identifying a BWP selected by the UE based on the BWP information transmitted by the network node; and after receiving the information, the network node transmitting to the UE a response message, wherein the response message contains information indicating whether or not the UE should switch from a currently active BWP to the selected BWP such that the selected BWP becomes the UE's new active BWP.

C13. The method of any one of the embodiments B1, C1-C4 or C12, further comprising the network node receiving from the UE a message comprising information indicating a load status for the currently active BWP as determined by the UE.

C14. The method of embodiment C13, wherein the message comprising the information indicating the determined load status for the currently active BWP further comprises a received signal strength indicator, RSSI, value and or a channel occupancy, CO, value.

C15. The method of any one of the embodiments B1, C1-C4, C12, C13, or C14, wherein the network node transmits the message comprising the BWP information as a result of: a) determining that the load status of a BWP has changed and is above a predefined threshold; b) determining that a UE has changed its active BWP; or c) the expiration of a timer.

C16. The method of any one of embodiments, B1, C1-C4, or C12-C15, further comprising: the network node determining the load indicator based on an average RSSI value and/or a channel occupancy, CO, value.

C17. The method of any one of the previous embodiments, wherein the load indicator is a one bit value, the load indicator comprises an average RSSI value, the load indicator comprises a channel occupancy value, or the load indicator comprises a channel occupancy value and an average RSSI value.

D1. A user equipment, UE, adapted to perform the method of any one of the embodiments A1 or C1-C11 or C15.

E1. A network node adapted to perform the method of any one of the embodiments B1 or C1-C4 or C12-C15.

F1. A UE 102, the UE comprising: a receiving unit 1202 operable to receive a message transmitted by a network node, characterized in that the message comprises bandwidth part, BWP, information comprising a first BWP load indicator for a first BWP, wherein the first BWP load indicator indicates a load status of the first BWP, wherein the first BWP is a first subset of contiguous common resource blocks; and a message processing unit 1204 configured to obtain the BWP information from the message.

G1. A network node 104, the network node comprising: a message generating unit 1402 configured to generate a message comprising bandwidth part, BWP, information comprising a first BWP load indicator for a first BWP, wherein the first BWP load indicator indicates a load status of the first BWP, wherein the first BWP is a first subset of contiguous common resource blocks; and a transmitting unit 1404 for employing a transmitter 1306 to transmit the message.

H1. A method performed by a UE, the method comprising: the UE determining a set of two or more load indicators based on measurements performed by UE 102, wherein the set of load indicators includes i) a first load indicator indicating a load status of a first BWP and ii) a second load indicator indicating a load status of a second BWP; the UE selecting a BWP based on the determined set of load indicators.

H2. The method of embodiment H1, wherein the selecting step is performed before a triggering of an RA procedure.

H3. The method of embodiment H1, wherein the selecting step is performed as a result of a triggering of an RA procedure.

H4. The method of embodiment H2 or H3, further comprising, after selecting the BWP, the UE performing the RA procedure using the selected BWP.

H5. The method of embodiment H4, further comprising: prior to performing the RA procedure using the selected BWP, the UE determining whether the selected BWP has a resource available to allow the UE to perform the RA procedure, wherein the UE performs the RA procedure using the selected BWP as a result of determining that the selected BWP has the resources available to allow the UE to perform the RA procedure.

The following text comprises the content of the appendix to the provisional patent application to which this application claims priority.

1. Introduction

At RAN2#103, RAN2 has discussed on how to enhance 4-step RACH procedure to overcome the reduced RACH opportunities due to LBT, and made the following agreements: (1) R2 assumes that RACH may be enhanced by additional opportunities, e.g. in time or frequency domain, FFS which messages the additional opportunities apply to; (2) Will study the model of single-RACH procedure. FFS multiple parallel procedure model; and (3) Will study impact to PREAMBLE_TRANSMISSION_COUNTER, PREAMBLE_POWER_RAMPING_COUNTER, ra-ResponseWindow, ra-ContentionResolutionTimer.

Solutions described herein are applicable to both 4-Step RACH and 2-Step RACH. It has been defined by RAN1 that NR-U supports different scenarios. This contribution mainly focuses on the scenario where an NR-U cell is the Primary cell. For other scenarios where an NR-U cell operates as a secondary cell, the standardization would require less efforts, since one can reuse LAA to a large extent.

2. Discussions 2.1 Guidelines for RACH Enhancements

Given the fact that the UE and the gNB has to perform listen before talk (LBT) prior to any transmission during a RACH procedure, companies have expressed a concern that a LBT at the PHY layer may lead to failure for the corresponding RACH procedure. Then, the UE may need to retransmit the PRACH preamble leading to additional latency for user plane (UP) data transfer. Therefore, companies have proposed various solutions to provide additional RACH opportunities for the UE. The additional opportunities can be allocated in time or frequency domain and implemented in either single or multiple parallel RACH procedures.

Observation 1: The solutions under discussions to provide additional RACH opportunities can be implemented in single or multiple parallel RACH procedures at the MAC.

However, substantial standardization efforts are expected to support such solutions and additional UE/gNB complexity, since the UE MAC may have to transmit multiple preambles and perform multiple LBTs in parallel to increase the success possibility for a RACH transmission. The gNB may need to provide multiple grants in a single RAR message as a response to a received preamble. All these functions are not supported in the legacy RACH procedure. Additionally, in the existing NR MAC spec in Rel-15, a UE can only initiate one RACH procedure at a time. In case a new RACH event is triggered while there is another RA on-going, it is up to UE implementation to decide to continue with the ongoing RA procedure or start a new procedure. The detailed specification is: "If the MAC entity receives a request for a new Random Access procedure while another is already ongoing in the MAC entity, it is up to UE implementation whether to continue with the ongoing procedure or start with the new procedure (e.g. for SI request)."

Observation 2: Substantial standardization efforts are expected to support enhanced RACH procedure by additional RA opportunities.

The legacy RACH procedure has been well defined in NR licensed. Therefore, NR-U should reuse the existing RACH procedure as much as possible to restrict the additional standardization changes, while at the same time, some necessary enhancements must be allowed to mitigate RACH performance loss due to LBT failures.

Proposal 1: RAN2 should reuse the existing RACH procedures (NR licensed) for NR-U as the baseline while allowing necessary enhancements by additional RA opportunities.

2.2 Discussions on Wideband Operation

RAN1 has been discussing approaches on how to achieve wideband operation for a UE in NR-U. The approaches under discussions include the carrier aggregation (CA) approach and the single carrier wideband approach (e.g., a UE can be configured with multiple active BWPs).

As described in [00179], compared to the single carrier wideband approach, the CA approach has less standard impact (using LTE-based LAA as baseline) and require less stringent processing requirements since parallel transport block processing can be performed independently per CC. There are also other drawbacks for the single carrier wideband approach highlighted in [00179]. One issue is about the case where a UE cannot grasp all configured LBT bandwidth pieces due to the LBT failures prior to a transmission. The MAC PDU has been already built for the full LBT bandwidth pieces before the LBT operations. The UE would then have no sufficient time left to reprocess the MAC PDU to fit with the bandwidth pieces that are grasped. Therefore, this contribution suggests that RAN2 agrees to support the CA based approach for wideband operation.

Proposal 2: In NR-U, the CA based approach (as in LAA) is supported for wideband operations.

Meanwhile, in NR licensed, the BWP concept has been introduced. The intention is to limit the UE to monitor only one active BWP to reduce UE power consumption. It is also motivated by a fact that it is typically unnecessary for a UE to support all BWPs be active at the same time for a limited data activity.

It is straightforward that NR-U sticks to the BWP concept to reduce the standardization efforts, so that the UE is configured with only one active BWP per carrier.

Proposal 3: NR-U sticks to the rules for BWP concept as in NR licensed, meaning that only one active BWP is configured for a UE per carrier.

2.3 RACH Enhancements to Combat LBT Failures 2.3.1 Channel-Occupancy Aware RA

In LTE eLAA/feLAA, the UE supports measurements of averaged RSSI and channel occupancy (CO) for measurement reports. The channel occupancy is defined as percentage of time that RSSI was measured above a configured threshold. The RSSI measurements together with the time information concerning when and how long time that UEs have made the measurements can assist the gNB/eNB to detect the hidden node.

Observation 3: Channel occupancy measurements are beneficial for the gNB to achieve a load balanced channel access and reduce the channel access collisions.

System congestion is likely the root cause for a LBT failure. If the UE can select the cell/BWP/channel with lowest congestion/load, the UE would then have highest probability to make a successful LBT. This observation is valid in general, not only in the context of random access, but also for data transmission. Therefore, in the context of random access, RAN2 shall study the channel-occupancy aware RACH procedure as the key solution to overcome the LBT failure. Compared to other solutions such as multiple RACH procedures across multiple BWPs, the channel-occupancy aware mechanism requires less specification efforts. For example, RAN2 could study conditions, such as the channel occupancy level, under which the UE can initiate RACH in a certain cell.

Therefore, the contribution makes the following proposals.

Proposal 4: RAN2 should study channel occupancy aware RACH procedure as one of the key solutions for NR-U RACH enhancements to overcome the LBT failures.

2.3.2 Additional RA Opportunities

With a channel-occupancy aware mechanism for RA, an NR-U UE can select the carrier/cell/BWP with lowest congestion for Message 1 transmission. So the UE can acquire the channel faster to transmit Message 1. However, a LBT failure may anyway occur for a UE in case the channel is highly loaded. It is necessary to further enhance RA procedure by providing additional RA opportunities.

In LAA, random access cannot be performed in the unlicensed cells. And in NR licensed, contention based random access (CBRA) can only be performed in the primary cell. It is reasonable to apply the same rules for NR-U as the baseline. In NR-U, it is beneficial to allow the UE to transmit an SR on any active serving cell to gain additional RA opportunities. In order to do this, the PRACH configuration/resources need to be configured for every serving cell (or optionally a subset of serving cells). Whenever a RA is triggered, the UE may perform LBT on multiple serving cells in parallel and select a cell with a successful LBT to transmit Msg1. It seems also reasonable to send the RAR in the same SCell in which the PRACH was sent earlier, since if the UE succeeded with LBT for the PRACH in that SCell, very likely the same SCell can offer good performances also for the RAR. Similar considerations apply to the following random access messages, such as msg3 and msg4. This would also limit the gNB/UE complexity to monitor the different random access messages in different cells.

Proposal 5: NR-U allows the UE to select any serving cell configured with PRACH resources to transmit a PRACH (both CBRA and CFRA).

Proposal 6: RAN2 assumes that RAR transmission, msg3 transmission, and msg4 transmission occurs in the same cell in which PRACH was initiated by the UE 2.4 Impact of LBT on RA Counters and Timers At RAN1#94, it has been agreed that: If preamble transmissions are dropped due to LBT failure, then From a RAN1 perspective, it is recommended that preamble power ramping is not performed and that the preamble transmission counter is not incremented. In some scenarios it is beneficial for the maximum RAR window size to be extended beyond 10 ms to increase robustness to DL LBT failure. FFS: Value of maximum RAR window size.

Based on above agreements, the PREAMBLE_TRANSMISSION_COUNTER and PREAMBLE_POWER_RAMPING_COUNTER should not be incremented in case the LBT failure occurs.

Observation 4: Based on RAN1 agreements, PREAMBLE_TRANSMISSION_COUNTER and PREAMBLE_POWER_RAMPING_COUNTER should not be incremented in case the LBT failure occurs.

In the existing NR RACH procedure, the PREAMBLE_TRANSMISSION_COUNTER is incremented when either of both below events occur: 1) the ra-Response Window expires while the UE has not received the RAR message and 2) the contention resolution has failed because the UE or the gNB may experience LBT failures for any message in RACH procedure, in order to avoid increment of PREAMBLE_TRANSMISSION_COUNTER due to LBT failures, both timers shall be started only when the LBT operation has succeeded at the PHY layer.

Proposal 7: The UE MAC starts the ra-ResponseWindow and the ra-ContentionResolutionTimer only when the LBT operation has succeeded at the PHY layer.

In the existing NR MAC spec subclause 5.1.3 (Random Access Preamble transmission), for each PRACH preamble, the MAC determines three things: (1) if PREAMBLE_POWER_RAMPING_COUNTER is needed to be incremented, (2) calculate PREAMBLE_RECEIVED_TARGET_POWER; (3) calculate RA-RNTI.

After the determination, the MAC instructs the PHY layer to transmit the PRACH preamble using the selected PRACH, corresponding RA-RNTI (if available), PREAM- BLE_INDEX and PREAMBLE_RECEIVED_TARGET_POWER. However, the PHY layer may not be able to perform the transmission at the expected time subjecting to the LBT operation. In the existing NR MAC spec, there is a feature called "power ramping suspension", with the reception of an indicator on power ramping suspension, the UE MAC doesn't increment PREAMBLE_POWER_RAMPING_COUNTER and the PRACH transmission power. It is reasonable to reuse this feature for power ramping operation in case the UE has experienced LBT failures. In more details, the PHY layer triggers a power ramping suspension indicator in case LBT operation has failed.

Proposal 8: The UE MAC reuses the power ramping suspension, i.e. it does not increment the PREAMBLE_POWER_RAMPING_COUNTER, in case the UE has experienced LBT failures.

RAN1 has also recommend that the RAR window may need to be extended beyond 10 ms. Similar logic is applicable to the contention resolution timer. It would be beneficial to extend the contention resolution timer to increase robustness to DL LBT failure. The exact values are need to further studied.

Proposal 9: Extend the RAR window beyond 10 ms (FFS values).

Proposal 10: Extend the ra-ContentionResulutionTimer (FFS values).

3. Conclusion

In section 2 the following observations were made:

Observation 1 The solutions under discussions to provide additional RACH opportunities can be implemented in single or multiple parallel RACH procedures at the MAC.

Observation 2 Substantial standardization efforts are expected to support enhanced RACH procedure by additional RA opportunities.

Observation 3 Channel occupancy measurements are beneficial for the gNB to achieve a load balanced channel access and reduce the channel access collisions.

Observation 4 Based on RAN1 agreements, PREAMBLE_TRANSMISSION_COUNTER and PREAMBLE_POWER_RAMPING_COUNTER should not be incremented in case the LBT failure occurs.

Based on the discussion in section 2 the following is proposed:

Proposal 1 RAN2 should reuse the existing RACH procedures (NR licensed) for NR-U as the baseline while allowing necessary enhancements by additional RA opportunities.

Proposal 2 In NR-U, the CA based approach (as in LAA) is supported for wideband operations.

Proposal 3 NR-U sticks to the rules for BWP concept as in NR licensed, meaning that only one active BWP is configured for a UE per carrier.

Proposal 4 RAN2 should study channel occupancy aware RACH procedure as one of the key solutions for NR-U RACH enhancements to overcome the LBT failures.

Proposal 5 NR-U allows the UE to select any serving cell configured with PRACH resources to transmit a PRACH (both CBRA and CFRA).

Proposal 6 RAN2 assumes that RAR transmission, msg3 transmission, and msg4 transmission occurs in the same cell in which PRACH was initiated by the UE Proposal 7 The UE MAC starts the ra-ResponseWindow and the ra-ContentionResulutionTimer only when the LBT operation has succeeded at the PHY layer.

Proposal 8 The UE MAC reuses the power ramping suspension, i.e. it does not increment the PREAMBLE_POWER_RAMPING_COUNTER, in case the UE has experienced LBT failures.

Proposal 9 Extend the RAR window beyond 10 ms (FFS values).

Proposal 10 Extend the ra-ContentionResulutionTimer (FFS values).

4. References

[1] R1-1809201, "Frame structure for NR-U", Ericsson

5. Text Proposal on Random Access Procedure

| | |
|---|---|
| 7.2.2 | Higher layer aspects |
| 7.2.2.1 | Random Access (RA) |
| | Both Contention based RA (CBRA) and Contention free RA (CFRA) are not supported. To overcome LBT failures, the PRACH preamble is allowed to transmit on any serving cell where the PRACH resources are configured. As in LTE LAA, the UE monitors the RAR on the primary cell. If UE is required to perform LBT before UL transmission, the ra-ResponseWindow and the ra-ContentionResolutionTimer are started only when the LBT operation has succeeded. The PHY layer triggers an indicator to the MAC layer on power ramping suspension in case LBT operation has failied. |

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:

the UE receiving a message transmitted by a network node, the message comprising bandwidth part (BWP) information comprising a first BWP load indicator for a first BWP, the first BWP load indicator indicating a load status of the first BWP, the first BWP being a first subset of contiguous common resource blocks, the BWP information further comprising a second BWP load indicator for a second BWP, the second BWP load indicator indicating a load status of the second BWP, the second BWP being a second subset of contiguous common resource blocks, and the second subset does not overlap with the first subset;

the UE obtaining the BWP information from the message;

the UE selecting a BWP from a set of BWPs comprising the first BWP and the second BWP based on the obtained BWP information; and the BWP information further comprising a bit map comprising a set of N bits in which:
   N is greater than 1;
   each of the N bits corresponds to a different BWP of the contiguous common resource blocks, and
   for each bit included in the set of N bits, the value of the bit indicates whether or not the message includes a BWP load indicator for the BWP to which the bit corresponds.

2. The method of claim 1, wherein the message is one of:
a media access control (MAC) control element (CE),
a Radio Resource Control (RRC) message,
Downlink Control Information (DCI) transmitted on a control channel, or
a System information Block (SIB).

3. The method of claim 1, wherein the BWP information further comprises a first BWP index, wherein the first BWP index identifies the first BWP.

4. The method of claim 1, wherein the UE uses the obtained BWP information to select a BWP as a result of a triggering of a random access procedure.

5. The method of claim 1, wherein the UE uses the obtained BWP information to select a BWP regardless of whether a random access procedure has been triggered.

6. The method of claim 4, further comprising:
the UE determining whether the selected BWP has a resource available to allow the UE to perform the random access procedure; and
as a result of determining that the selected BWP has a resource available to allow the UE to perform the random access procedure, the UE switching from an active BWP to the selected BWP and the UE using the selected BWP to perform the random access procedure.

7. The method of claim 1, wherein
the UE uses the obtained BWP information to select a BWP after the UE has initiated a random access procedure and before the random access procedure has completed, and
the method further comprises:
the UE determining whether the selected BWP has a resource available to allow the random access procedure to be completed; and
as a result of determining that the selected BWP has a resource available to allow the random access procedure to be completed, the UE switches from an active BWP to the selected BWP and the UE uses the selected BWP to complete the random access procedure or restart the random access procedure.

8. The method of claim 1, further comprising:
the UE transmitting to the network node information identifying the BWP selected by the UE based on the received BWP information; and
after transmitting the information to the network node, the UE receiving a response message transmitted by the network node, the response message containing information indicating whether or not the UE should switch from a currently active BWP to the selected BWP such that the selected BWP becomes the UE's new active BWP.

9. The method of claim 1, further comprising:
the UE determining a load status for a currently active BWP, wherein the currently active BWP is different than the first BWP; and
the UE using the obtained BWP information and the determined load status for the currently active BWP to select a BWP from a set of available BWPs.

10. The method of claim 9, further comprising the UE transmitting to the network node a message comprising information indicating the determined load status for the currently active BWP.

11. The method of claim 10, wherein the information indicating the determined load status for the currently active BWP further comprises a received signal strength indicator value and/or a channel occupancy value.

12. The method of claim 1, wherein
the load indicator is a one bit value,
the load indicator comprises an average received signal strength indicator (RSSI) value,
the load indicator comprises a channel occupancy value, or
the load indicator comprises a channel occupancy value and an average RSSI value.

13. A method performed by a network node, the method comprising:
the network node transmitting a message comprising bandwidth part (BWP) information comprising a first BWP load indicator for a first BWP and a second BWP load indicator for a second BWP, the first BWP being a first subset of contiguous common resource blocks, the second BWP being a second subset of contiguous common resource blocks, the second subset does not overlap with the first subset, the first BWP load indicator indicating a load status of the first BWP, and the second BWP load indicator indicating a load status of the second BWP, the BWP information further comprising a bit map comprising a set of N bits in which:
   N is greater than 1,
   each of the N bits corresponds to a different BWP of the set of contiguous common resource blocks, and
   for each bit included in the set of N bits, the value of the bit indicates whether or not the message includes a BWP load indicator for the BWP to which the bit corresponds, the network node receiving from a user equipment (UE) information identifying a BWP selected by the UE based on the BWP information transmitted by the network node; and
after receiving the information, the network node transmitting a response message to the UE, the response message containing information indicating whether or not the UE should switch from a currently active BWP to the selected BWP such that the selected BWP becomes the UE's new active BWP.

14. The method of claim 13, wherein the message is a media access control-control element (MAC-CE), a Radio Resource Control (RRC) message, Downlink Control Information (DCI) transmitted on a control channel, or a System information Block.

15. The method of claim 13, wherein the BWP information further comprises a first BWP index, wherein the first BWP index identifies the first BWP.

16. The method of claim 13, further comprising the network node receiving from the UE a message comprising information indicating a load status for the currently active BWP as determined by the UE.

17. The method of claim 16, wherein the message comprising the information indicating the determined load status for the currently active BWP further comprises a received signal strength indicator (RSSI) value and or a channel occupancy value.

18. The method of claim 13, wherein the network node transmits the message comprising the BWP information as a result of at least one of:

a) determining that the load status of a BWP has changed and is above a predefined threshold,
b) determining that a UE has changed its active BWP, or
c) the expiration of a timer.

19. The method of claim 13, further comprising:
the network node determining the load indicator based on an average received signal strength indicator value and/or a channel occupancy value.

20. The method of claim 13, wherein
the load indicator is a one bit value,
the load indicator comprises an average received signal strength indicator (RSSI) value,
the load indicator comprises a channel occupancy value, or
the load indicator comprises a channel occupancy value and an average RSSI value.

21. A user equipment (UE), the UE comprising:
a processor; and
memory coupled with the processor, wherein the memory comprises instructions that when executed by the processor causes the UE to perform the method of claim 1.

22. A network node, the network node comprising:
a processor; and
memory coupled with the processor, wherein the memory comprises instructions that when executed by the processor cause the network node to perform the method of claim 13.

* * * * *